(12) United States Patent
Miyakawa et al.

(10) Patent No.: US 7,227,649 B2
(45) Date of Patent: Jun. 5, 2007

(54) SURFACE INSPECTION APPARATUS

(75) Inventors: Kazuhiro Miyakawa, Itabashi-ku (JP); Yoichiro Iwa, Itabashi-ku (JP)

(73) Assignee: Kabushiki Kaisha Topcon, Tokyo (JP)

( * ) Notice: Subject to any disclaimer, the term of this patent is extended or adjusted under 35 U.S.C. 154(b) by 13 days.

(21) Appl. No.: 11/274,248

(22) Filed: Nov. 16, 2005

(65) Prior Publication Data

US 2006/0103856 A1 May 18, 2006

(30) Foreign Application Priority Data

Nov. 18, 2004 (JP) .............................. 2004-333858

(51) Int. Cl.
  *G01B 11/28* (2006.01)
  *G01J 4/04* (2006.01)
(52) U.S. Cl. ...................... 356/630; 356/369
(58) Field of Classification Search .. 256/237.1–237.6, 256/364–369, 630, 326; 250/559.09, 559.11, 250/559.41, 559.45
  See application file for complete search history.

(56) References Cited

U.S. PATENT DOCUMENTS 5,333,052 A * 7/1994 Finarov ...................... 356/369
5,835,220 A * 11/1998 Kazama et al. ............. 356/369
6,795,185 B2 * 9/2004 Yoshizawa et al. ......... 356/369
2005/0270522 A1 * 12/2005 Miyakawa et al. ...... 356/237.2

FOREIGN PATENT DOCUMENTS

JP 07-159131 A 6/1995

* cited by examiner

*Primary Examiner*—Sang H. Nguyen
(74) *Attorney, Agent, or Firm*—Buchanan Ingersoll & Rooney PC (57) ABSTRACT

A surface inspection apparatus (100) comprises a light (10) source for emitting a light beam L0, an optical illumination system (30) for projecting the light beam on an inspected surface (220) formed by a film 210, an optical detection system (50) having lenses to spatially split reflection lights and an aperture stop (60) having apertures disposed with polarization elements (61–64) for transilluminating mutually different polarized light components, a light intensity detection device (41–44) for individually detecting the light intensities of the respective reflection lights passed through the respective polarization elements, a scanning device (20), and an arithmetic processing device (70) for detecting the polarization conditions of the respective reflection lights and obtaining a film thickness of the film and at least one of the physical properties of the film.

12 Claims, 10 Drawing Sheets

SURFACE INSPECTION APPARATUS

CROSS-REFERENCE TO THE RELATED APPLICATION

The application claims the priority benefit of Japanese Patent Application No. 2004-333858 filed on Nov. 18, 2004, the contents of which are incorporated herein by reference in its entirety.

BACKGROUND OF THE INVENTION

1. Field of the Invention

The present invention relates to a surface inspection apparatus, and more specifically, to an improvement in a surface inspection apparatus which obtains physical properties such as a thickness and so forth, of a predetermined film coating an inspected surface.

2. Related Art Statement

Heretofore, there has been widely known an ellipsometer as a surface inspection apparatus which obtains a thickness and other characteristics of optical properties (a refractive index, etc.) of a coating film formed on an inspected surface.

The ellipsometer projects a light beam emitted from a light source onto a predetermined area of the inspected surface on which the film is formed, and detects intensities of regularly reflected lights from the predetermined area in 3 mutually different polarization directions (p-plane of polarization, s-plane of polarization and a direction which the principal axis tilts +45° with respect to the p- and s-plane of polarization, respectively) as the following 4 data: I1, I2, I3 and I4:

$$I1 = |Ex|^2$$

$$I2 = |Ey|^2$$

$$I3 = (1/2)|Ex + Ey|^2$$
$$= (1/2)\{|Ex|^2 + |Ey|^2\} + |Ex||Ey|\cos\delta$$

$$I4 = (1/2)|iEx + Ey|^2$$
$$= (1/2)\{|Ex|^2 + |Ey|^2\} + |Ex||Ey|\sin\delta$$

Where Ex represents the intensity of the s-plane polarized light component, Ey represents that of the p-plane polarized light component, δ (δ=δx−δy) represents a subtraction value of a phase difference δy between the p-plane polarized light before and after reflection from a phase difference δx between the s-plane polarized light before and after reflection. "i" represents an imaginary unit. I1 represents the intensity of the regularly reflected light from the s-plane of polarization, I2 represents that from the p-plane of polarization, and I3 represents that from a plane of polarization with a direction of its principal axis at 45° (azimuth angle), and I4 represents a intensity from a plane of polarization with the azimuth angle of 45° after light passed through a ¼ wavelength plate and transferred into a linearly polarized light.

On the other hand, 4 Stokes parameters, S0, S1, S2 and S3, which characterize polarization conditions, are defined respectively as follows:

$$S0 = |Ex|^2 + |Ey|^2$$

$$S1 = |Ex|^2 - |Ey|^2$$

$$S2 = 2|Ex||Ey|\cos\delta$$

$$S3 = 2|Ex||Ey|\sin\delta$$

Thus, the Stokes parameters S0 to S3 can be calculated as the followings, using the 4 data of the detected light intensities I1 to I4.

$$S0 = I1 + I2$$

$$S1 = I1 - I2$$

$$S2 = 2 \cdot I3 - (I1 + I2)$$

$$S3 = 2 \cdot I4 - (I1 + I2)$$

Therefore, based on the thus obtained Stokes parameters, it is capable to obtain the optical constants (Hereinafter, these are generally referred to as physical properties of a film.), such as a film thickness d, a refractive index n and an absorption coefficient (an extinction coefficient) K and so forth. Furthermore, it is also capable to identify an unknown object which forms a coating film, in conjunction with a database wherein optical constants and corresponding chemical names are pre-defined.

However, for an ellipsometer equipped with only a single wavelength detector, since it is demanded for the ellipsometer to detect each of the 4 light intensities in the above mentioned 3 polarized light directions respectively, it is necessary to carry out detections for 4 times to obtain each of the light intensities I1, I2, I3 and I4 respectively, by sequentially switching a analyzer and a ¼ wavelength plate disposed in the optical path of a reflection light to be detected and thus the detection time is long. Therefore, it is desired to shorten the detection time.

However, in detecting a light intensity of a reflection light on a predetermined area of an inspected surface, as several iterative detections are carried out according to the numbers of the polarized light directions, the conventional ellipsometer described above has no problem in a case when a subject to be detected is only a partial area of the inspected surface; while in another case when the subject to be detected is of multiple areas, such as the overall area of an inspected surface is to be detected in detail, it is necessary for the inspected surface to be transferred manually to a next area to make another detection after a detection on one area is finished, it takes considerably long detection time and is troublesome.

As a result, there has been proposed an ellipsometer, which uses a beam splitter to split the optical path of a reflection light into 4 optical paths, in 3 of the 4 optical paths, 3 analyzers with mutually different principal axis directions are disposed accordingly, a ¼ wavelength plate and a analyzer are disposed in the left one. Based on the fact that the reflection lights passed through the analyzers in each optical path are detected respectively by the respective 4 light intensity detectors, it is possible to detect simultaneously the 4 light intensities (I1, I2, I3 and I4) of the reflection lights with different polarization conditions in one-time detection (for reference, see Japanese Patent Laid-Open H7-159131).

According to the above technology, it is capable to detect simultaneously the light intensities with 4 different polarization conditions. As no iterative detection is necessary, it is possible to shorten the detection time.

Although the technology to obtain simultaneously 4 detection results in one determination process for an area by splitting the optical path of a reflection light was described in the reference patent, it has no problem in a case when the inspected surface is a flat and smooth mirror one; while in another case when the inspected surface includes coarse surfaces rather than a mirror surface, scattered lights which are a noise component reflected on the coarse surfaces overlapped with the regularly reflected lights which are a signal component will be detected, S/N becomes lower and so does the reliability of the detection result.

SUMMARY OF THE INVENTION

It is, therefore, an object of the present invention which has been made in view of the aforementioned problems is to provide a surface inspection apparatus, which is capable to carry out the detection easily and efficiently, even when the subject to be detected is of multiple areas, such as the overall area of an inspected surface is to be detected; and to prevent or significantly suppress the overlap of the noise component in the case when the inspected surface is a coarse one.

To accomplish the above object, the surface inspection apparatus according to one embodiment of the present invention includes a light source for emitting a light beam with known polarization conditions; an optical illumination system for projecting the light beam emitted from the light source on a predetermined area of an inspected surface formed by a predetermined film; an optical detection system having lenses and an aperture stop in which the lenses spatially split reflection lights from multiple mutually different small areas of the predetermined area and transilluminate the reflection lights, and the aperture stop has the same number of apertures corresponding to that of the small areas; polarization elements being disposed on light paths of the respective reflection lights passed through the respective apertures in the aperture stop and transilluminating mutually different polarized light components; a light intensity detection device for individually detecting the light intensities of the respective reflection lights passed through the respective polarization elements; a scanning device for making the light beam scan the inspected surface in a way to assure that the reflection lights from the respective small areas would pass all the respective apertures in the aperture stop sequentially; and an arithmetic processing device for detecting the polarization conditions of the respective reflection lights from the predetermined area based on the detection result of the light intensities of the multiple mutually different polarized light components of the respective reflection lights, and on the basis of the determined polarization conditions a film thickness of the film and at least one of the physical properties of the film can be obtained.

According to the surface inspection apparatus of the present invention, it is possible to prevent, or suppress the overlapping of scattered lights which are the noise component scattering diffusely away from the regularly reflected direction, and improve the determination accuracy.

According to the surface inspection apparatus of the present invention, it is possible to take not only the partial area but also the overall area of the inspected surface as the inspecting object, and to carry out a surface inspection easily and effectively.

BRIEF DESCRIPTION OF THE DRAWINGS

FIG. 2 is a view showing relationship between a laser beam (projecting light) emitted by the surface inspection apparatus shown in FIG. 1 and regularly reflected light; in which

DETAILED DESCRIPTION OF PREFERRED EMBODIMENTS

One preferred embodiment of a surface inspection apparatus of the present invention will be hereinafter described with reference to the drawings.

Figure 1:
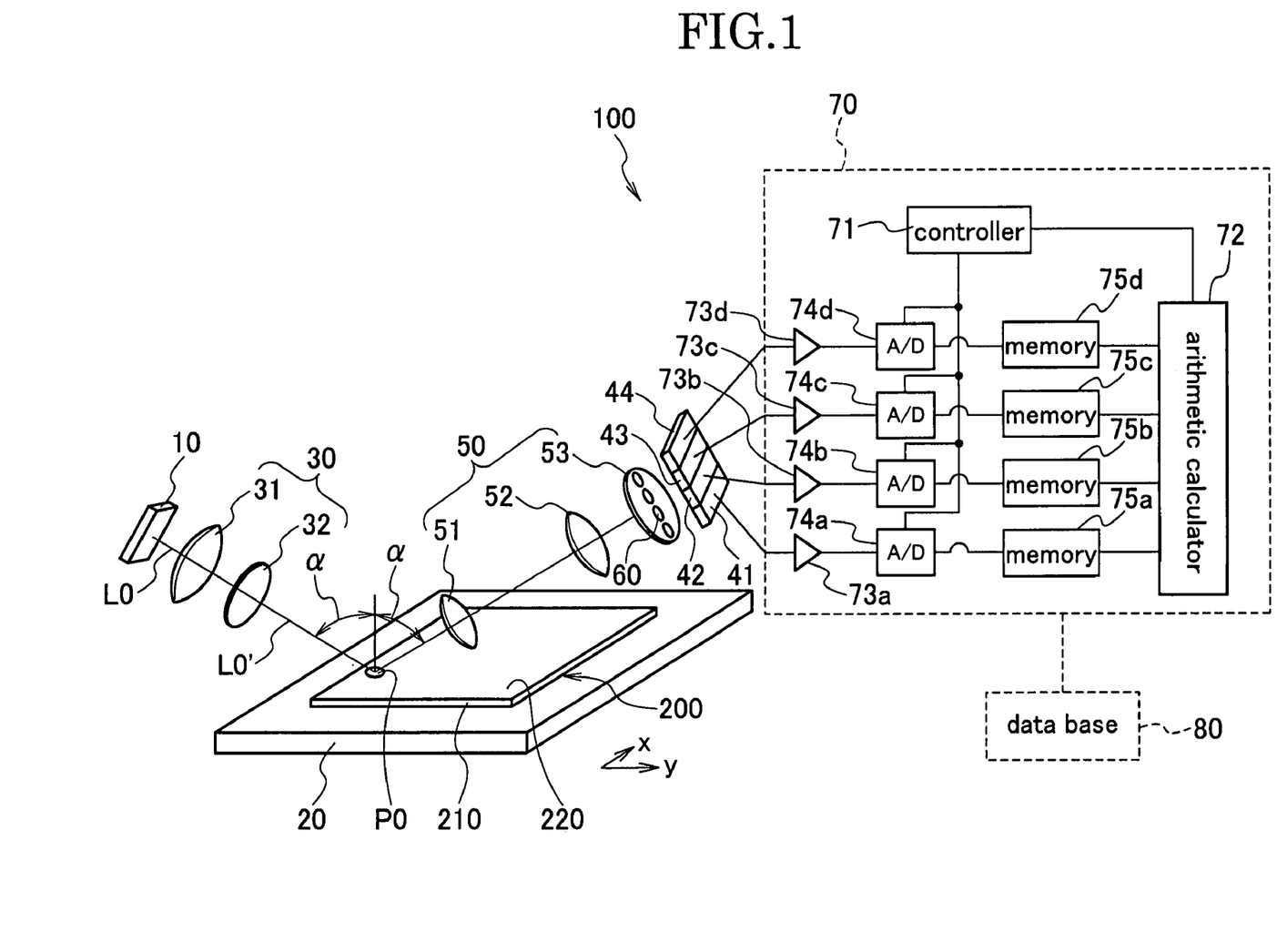
FIG. 1 is a block view showing a surface inspection apparatus according to one embodiment of the present invention.

The surface inspection apparatus 100 shown in FIG. 1 comprises an xy 2 dimensional scanning stage 20 or a scanning device, a laser light source 10, an optical illumination system 30, light receiving units or a light intensity detecting device 41, 42, 43, and 44, an optical detection system 50, polarization elements 60, and an arithmetic processing device 70.

An inspected object 200 having an inspected surface 220 on which a predetermined film 210 is formed is laid on the xy 2 dimensional scanning stage 20.

The laser light source 10 emits a laser beam L0, which is a projecting light.

The laser beam L0 emitted from the laser light source 10 is projected by the optical illumination system 30 at a predetermined incident angle α on a predetermined area P0 in the inspected surface 220 of the inspected object 200 laid on the stage 20;

The 4 light receiving units 41, 42, 43 and 44 detect light intensities I1, I2, I3 and I4.

A regularly reflected light reflected on the predetermined area P0 is spatially split into 4 reflection lights L1, L2, L3 and L4 reflected on the respective 4 mutually different small areas P1, P2, P3 and P4 in the predetermined area P0. The regular reflected lights L1 to L4 are guided to their corresponding light receiving units 41, 42, 43 and 44 respectively through the optical detection system 50, which has an objective lens 51, a condenser lens 52 and an aperture stop 53 on which 4 apertures 53a, 53b, 53c and 53d are formed.

The polarization device 60 has 4 polarization elements 61 to 64, each of which is disposed in each light path of the 4 regularly reflected lights L1 to L4 obtained by passing the reflection light through the optical detection system 50, and the 4 reflection lights L1 to L4 transilluminate the polarization elements as mutually different polarized light components M1, M2, M3 and M4, respectively.

The arithmetic processing device 70 identifies polarization conditions of each of the small areas P1 to P4 depending on the light intensities I1 to I4 determined by each of the light receiving units 41 to 44, and determines a film thickness (d) of the film 210 and the optical constants (the refractive index, the extinction coefficient, and so forth) which identify the material type of the film 210 based on the identified polarization conditions.

Herein, the optical illumination system 30 includes a condenser lens 31 and a polarization unit 32 which regulates the laser beam L0 passing through the condenser lens 31 into predetermined polarized light components. It is presumed that the polarization conditions of a laser beam L0' which reaches the inspected surface 220 after passing through the polarization unit 32 is already known.

Figure 3:
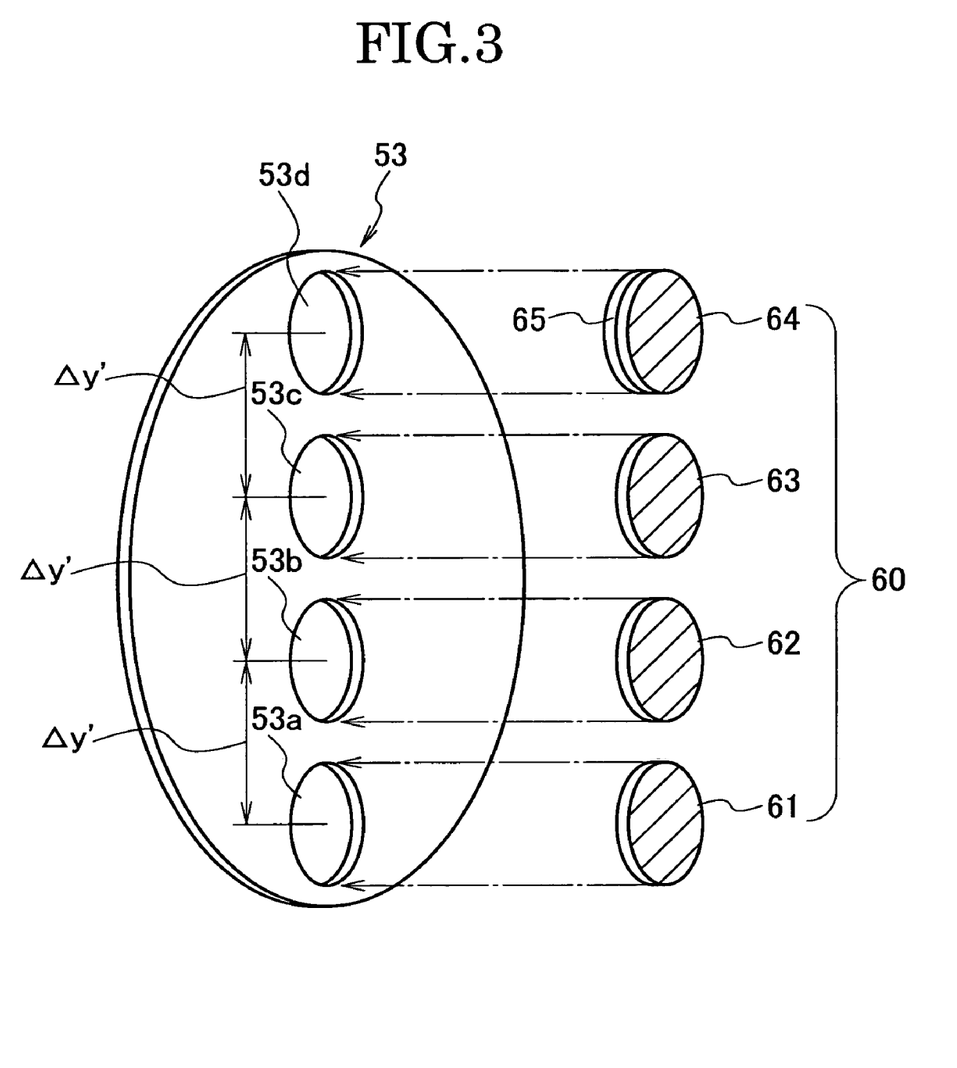
FIG. 3 is a view showing an aperture stop wherein polarized light elements are incorporated into each aperture.

The polarization elements 60, as shown in detail in FIG. 3, comprises the 4 photo detectors of 61, 62, 63, 64, and a ¼ wavelength plate 65 attached to a light incident side of the detector 64. The photo detectors 61, 62, 63, 64 and the ¼ wavelength plate 65 attached to the detector 64 are disposed so as to occlude the respective apertures 53a, 53b, 53c and 53d in the aperture stop 53 and integrated with the aperture stop 53. Moreover, the apertures 53a, 53b, 53c and 53d are configured with an equal space $\Delta y'$.

Figure 2A:
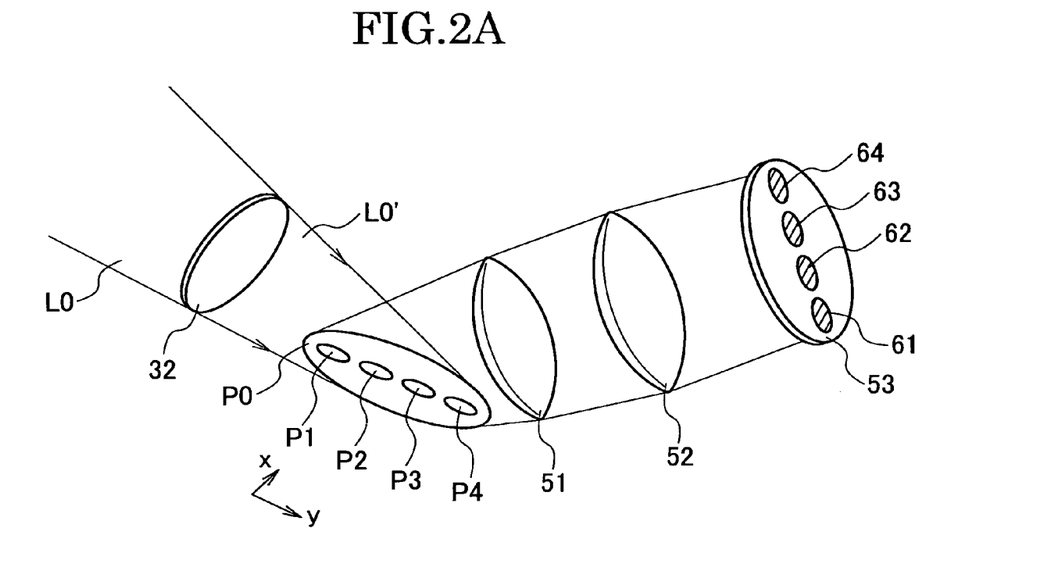
FIG. 2A is a side view.

As shown in FIG. 2, the respective principal axes of the photo detectors 61, 62, 63 and 64 are set so that the detector 61 passed a s-plane polarized light component M1 (hereinafter referred to as the first polarized light component M1) of the regularly reflected light L1 from the small area P1 which passes through the corresponding aperture 53a, the detector 62 passes a p-plane polarized light component M2 (hereinafter referred to as the second polarized light component M2) of the regularly reflected light L2 from the small area P2 which passes through the corresponding aperture 53b, the detector 63 passes a polarized light component M3 (hereinafter referred to as the third polarized light component M3) tilted at 45° with respect to p- and s-plane polarizations of the regularly reflected light L3 from the small area P3 which passes through the corresponding aperture 53c, and the detector 64 passes a polarized light component M4 (hereinafter referred to as the fourth polarized light component M4) tilted at 45° with respect to p- and s-plane polarizations of the regularly reflected, light L4 which is linearly polarized by the ¼ wavelength plate 65, respectively.

Whereby, 42, 43 and 44, there the first polarized light component M1 of the regularly reflected light L1 from the small area P1 is projected onto the light receiving detector 41, the second polarized light component M2 of the regularly reflected light L2 from the small area P2 is projected onto the light receiving detector 42, the third polarized light component M3 of the regularly reflected light L3 from the small area P3 is projected onto the light receiving detector 43, and the fourth polarized light component M4 of the regularly reflected light L4 from the small area P4 is projected onto the light receiving detector 44, respectively.

As shown in FIG. 1, the stage 20 is configured to be driven by a combination of a primary scanning along x, minus (−) x direction and a secondary scanning along y, minus (−) y direction, so that the laser beam L0' is projected sequentially on the overall surface of the inspected surface 220 with respect to the inspected surface 220 of the inspected object 200 laid on the stage 20.

Figure 4:
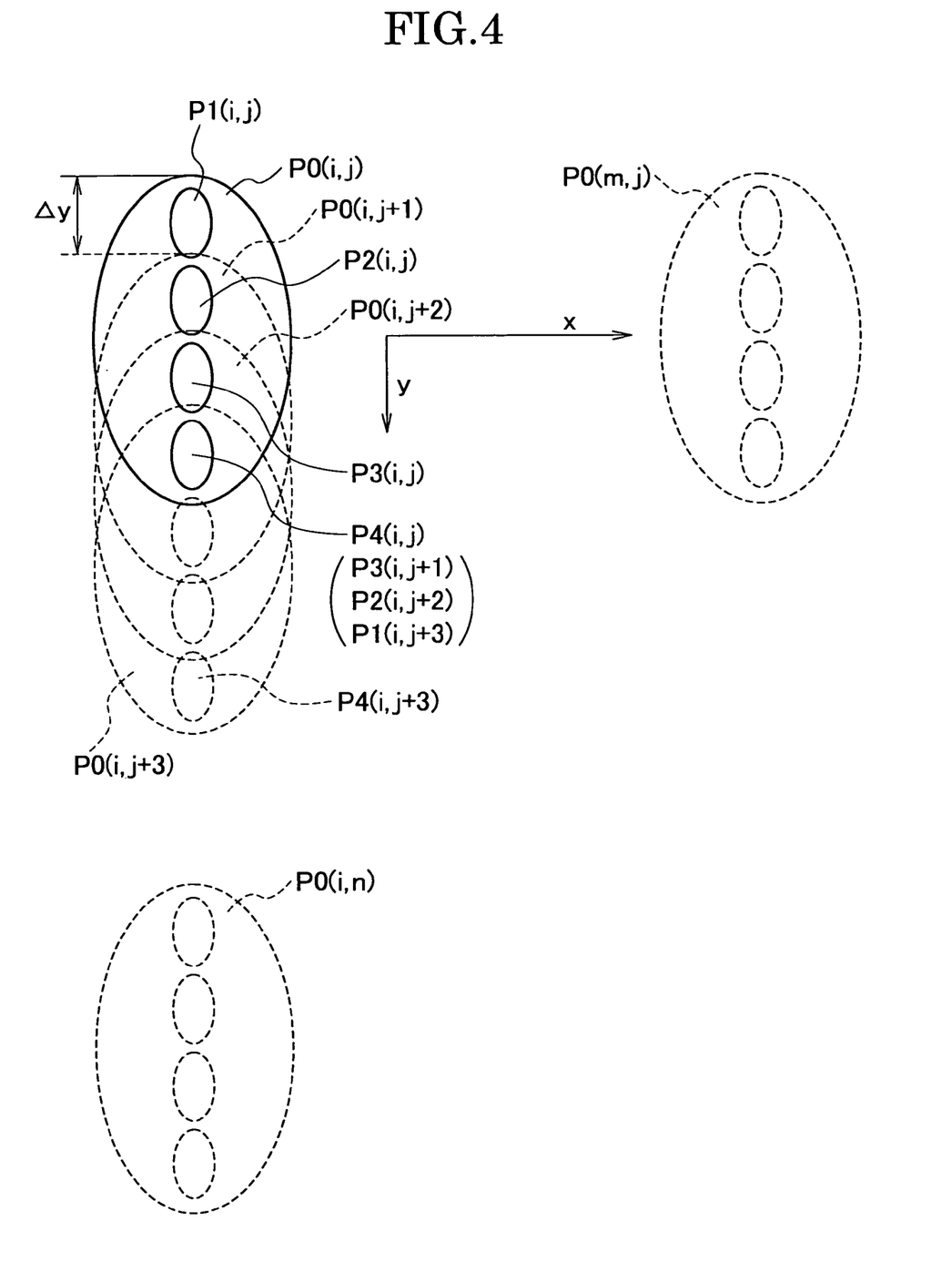
FIG. 4 is a pattern view showing how the corresponding relationship of small areas varies with respect to scanning.

Here, the secondary scanning pitch $\Delta y$ of the stage 20 along minus (−) y direction is set at the point of about ¾ of the y axial diameter of the predetermined area P0, i.e. a scan spot, where the laser beam L0' projects on the inspected surface 220. In other words, as shown in FIG. 4, for the predetermined area (the scan spot) P0 (i, j) at x=i on any primary scanning line (y=j), the next scanning spot P0 (i, j+1) at x=i on next primary scanning line (y=j+1) with only one line translation on the secondary scanning direction has only a translation of $\Delta y$ on y axis.

Thus, the pitch $\Delta y$ along the secondary scanning direction is so set that the small areas P2 (i, j), P3 (i, j) and P4 (i, j) in the scanning spot P0 (i, j) are corresponding to the respective small areas P1 (i, j+1), P2 (i, j+1) and P3 (i, j+1) in the next scan spot P0 (i, j+1) with only one line translation in the primary scanning line along the secondary scanning direction.

That is to say, the secondary scanning pitch $\Delta y$ of the laser beam L0' is so set as to correspond to the respective pitch $\Delta y'$ between the apertures 53a and 53b, 53b and 53c, 53c and 53d in the aperture stop 53.

As a result, the reflection light L4 from the small area P4 sequentially passes through all the apertures in the aperture stop 53 in a order of 53d, 53c, 53b and 53a in accordance with the advancement of the secondary scanning, more specifically in a range of 4 contiguous primary scanning lines (y=j, j+1, j+2 and j+3) along the secondary scanning direction (y direction).

Similar to the reflection light L4, since the reflection lights L1, L2 and L3 from the other respective small areas P1, P2 and P3 sequentially pass through all the apertures in the aperture stop 53 in the order of 53d, 53c, 53b and 53a in the range of the 4 primary scanning lines, it is possible to obtain with a time lag the 4 polarized light components M1 to M4 for the respective 4 small areas in the scanning area excluding the edge part right after the start of scanning and the edge part right before the end of scanning.

The arithmetic processing device 70 includes amplifiers 73a, 73b, 73c and 73d, A/D converters 74a, 74b, 74c and 74d, memory units 75a, 75b, 75c and 75d, an arithmetic calculator 72 and a controller 71.

The amplifiers 73a, 73b, 73c and 73d are connected to the respective light receiving units 41, 42, 43 and 44, and magnify the polarized light components M1 to M4, which are detected by the respective light receiving units 41 to 44, of the respective regularly reflected lights L1 to L4 reflected on the respective small areas P1 to P4.

The A/D converters 74a, 74b, 74c and 74d are connected to the respective amplifiers 73a, 73b, 73c and 73d , and convert light intensities I1 to I4 of the respective polarized light components M1 to M4 with a given sampling period synchronized to that of the scanning of the stage 20 from analogue to digital.

The memory units 75a, 75b, 75c and 75d are connected to the respective A/D converters 74a, 74b, 74c and 74d, and store the digitalized light intensities I1 to I4 of the respective polarized light components M1 to M4.

The arithmetic calculator 72 is connected to the memory units 75a, 75b, 75c and 75d. Depending on calculations on the light intensities I1 to I4, which are stored in the memory units 75a, 75b, 75c and 75d, of the respective polarized light components M1 to M4 with corresponding to the respective small areas P1 to P4, it calculates the Stock parameters S0, S1, S2 and S3 for the respective small areas P1 to P4, and on the basis of the Stock parameters it obtains the film thickness and other physical properties of the film 210.

The controller 71 controls the amplifiers 73a to 73d, the A/D converters 74a to 74d, the memory units 75a to 75d and the arithmetic calculator 72.

In addition, it is preferred to connect a data base 80, wherein a data group containing physical property data and corresponding chemical names and so forth are pre-stored, to the arithmetic processing device 70. The arithmetic processing device 70 may identify the chemical name etc. of the film 210 by comparing the physical property data obtained by the arithmetic calculator 72 in the arithmetic processing device 70 with the data group stored in the data base 80.

It is also preferred that the laser beam L0 emitted from the laser source 10 is emitted as a mere single beam. As the light intensity distribution generally presents a Gaussian distribution, the light volume distribution (distribution of the light intensity I) of a single beam in the scanning spot P0 would be non-uniform.

Figure 5:
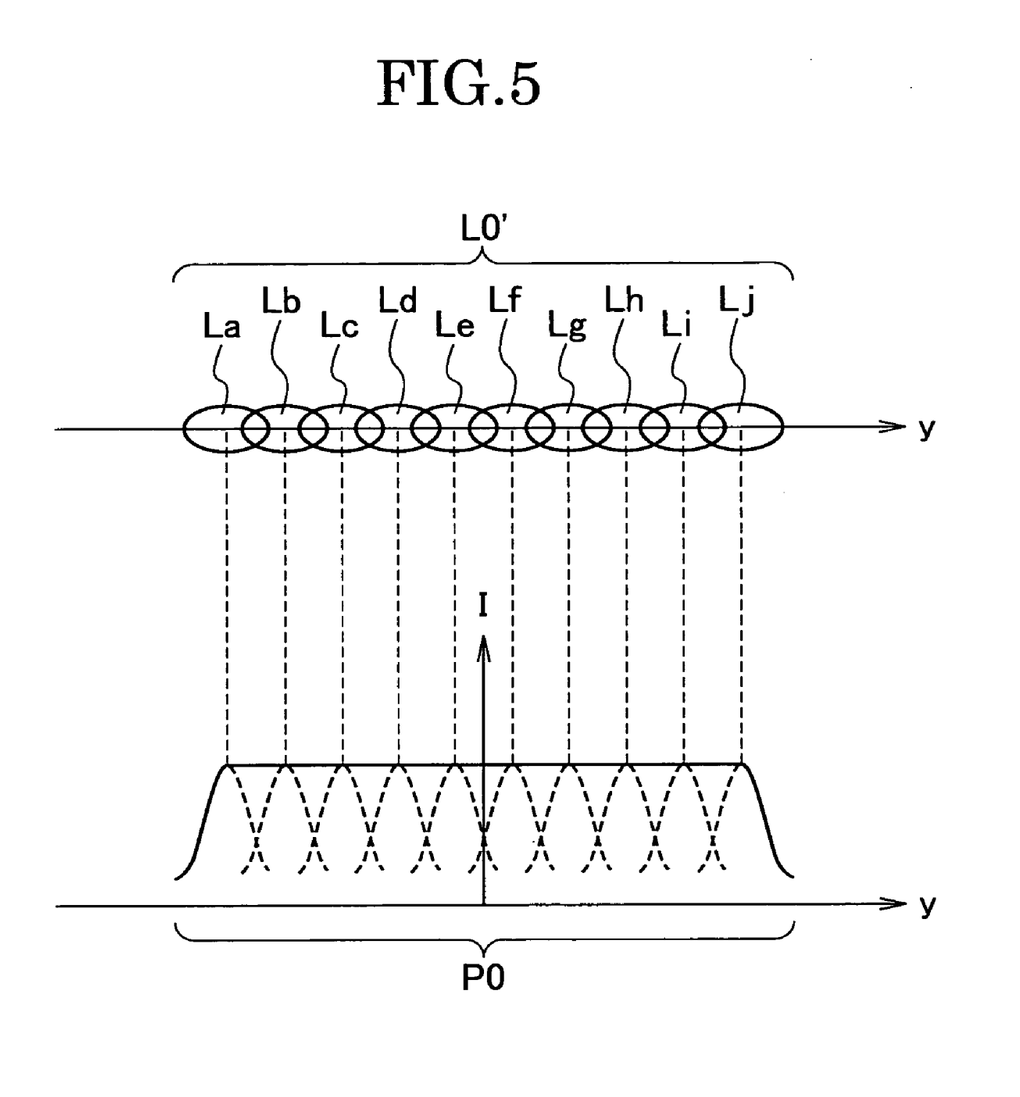
FIG. 5 is a view showing a roughly uniform light intensity distribution of a illumination light emitted from a light source.

As shown in FIG. 5, the light source 10 used in the surface inspection apparatus 100 of the embodiment is supposed to project for example 10 light beams (They may be any number of beams if they are more than 2.) La to Lj, these beams are partially overlapped and aligned along y direction in the scanning spot P0, hence the overall light intensity distribution of the laser beam L0' along y direction would be nearly uniform. The so-constructed light source 10 functions as a light intensity distribution adjusting device to adjust light intensity distributions of laser beam L0' reached the predetermined area P0 so that the light intensity distributions over all the small areas P1 to P4 would be uniform.

In addition, even if the light source 10 emits a mere single beam, as the light intensity distribution of the center of the beam is nearly a constant, it is also possible to stop down the scanning spot of a large diameter by an aperture stop so that only the center of the beam might reach the predetermined area P0. Such aperture stop functions as a light intensity distribution adjusting device.

The mechanism of the surface inspection apparatus 100 according to the present embodiment will be described as follows.

First, the light source 10 emits the laser beam L0 with the nearly uniform light intensity distribution onto the inspected surface 220 of the inspected object 200 laid on the stage 20. The laser beam L0 passes through the condenser lens 31, and is converted by the polarization unit 32 into the laser beam L0' with the polarization plane along its principal axis, and then is projected onto the predetermined area P0 of the inspected surface 220 as a scanning spot.

The regularly reflected light of the emitted laser beam L0' is projected from the predetermined area P0 of the inspected surface 220, passes through the object lens 51 and condenser lens 52, and reaches the aperture stop 53.

Figure 2B:
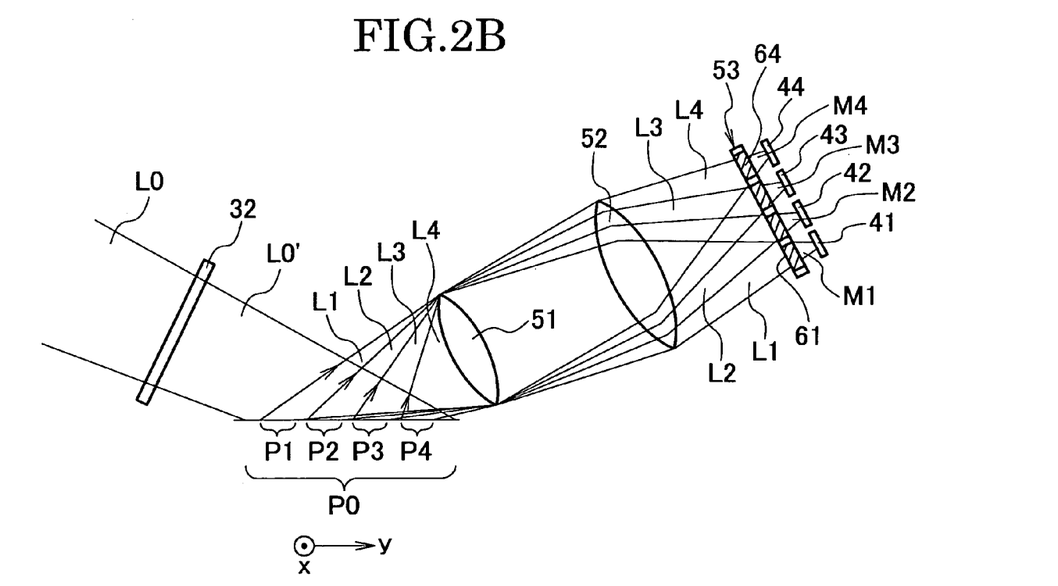
FIG. 2B is a cross-section view along the optical path.

As shown in FIG. 2b, what has passed through the aperture 53a formed in the aperture stop 53 is only the regularly reflected light L1 from the small area P1 in the predetermined area P0. Similarly, what have passed through the apertures 53b, 53c and 53d are only the respective regularly reflected lights L2, L3 and L4 from the respective small areas P2, P3 and P4 in the predetermined area P0.

Thus for the regularly reflected light L1 from the small area P1 projected into the aperture 53a, only the first polarized light component M1 of the regularly reflected light L1 is allowed to pass through the aperture 53a by the photo detector 61 disposed in the aperture 53a and fall into the light receiving unit 41 disposed with correspondence to the aperture 53a, thus the light intensity I1 is detected.

Similarly, for the regularly reflected light L2 from the small area P2 projected into the aperture 53b, only the second polarized light component M2 of the regularly reflected light L2 is allowed to pass through the aperture 53b by the photo detector 62 disposed in the aperture 53b and fall into the light receiving unit 42 disposed with correspondence to the aperture 53b, thus the light intensity I2 is detected.

For the regularly reflected light L3 from the small area P3 projected into the aperture 53c, only the third polarized light component M3 of the regularly reflected light L3 is allowed to pass through the aperture 53c by the photo detector 63 disposed in the aperture 53c and fall into the light receiving unit 43 disposed with correspondence to the aperture 53c, thus the light intensity I3 is detected.

The regularly reflected light L4 from the small area P4 projected into the aperture 53d is deviated in phase and converted into a linearly polarized light by ¼ wavelength plate 65. The fourth polarized light component M4 of the linearly polarized light is allowed to pass through the aperture 53d by the photo detector 64 disposed in the aperture 53d and fall into the light receiving unit 44 disposed with correspondence to the aperture 53d, thus the light intensity I4 is detected.

After that, the light intensities I1 to I4 detected by the respective light receiving units 41 to 44 are input into the corresponding amplifiers 73a to 73d respectively to be magnified, then they are input into the respective A/D converters 74a to 74d and sampled with synchronization to the stage 20, and stored in the respective memory units 75a to 75d.

Meanwhile, the position where laser beam L0' projects on the inspected surface 220 translates successively through the parallel translations of the stage 20 along −x direction during this period, the laser beam L0' carries out a primary scanning on the inspected surface 220. Through the primary scanning, the light intensities I1 to I4 of the respective polarized light components M1 to M4 of the respective small areas p1 to P4 in the scanning spot P0 are stored in the respective memory units 75a to 75d according to the sampling synchronization period of the A/D converters.

As the primary scanning along x direction finishes, the stage 20 returns back to its initial position along x direction. After a secondary scanning with only the pitch Δy translated along −y direction is finished, once again with the translation to the −x direction, and the second line primary scanning is carried out.

Herein, as shown in FIG. 4, the position (P4 (i, j)) which is the small area P4 on the inspected surface 220 in the first line primary scanning corresponds to the small area P3 (P3 (i, j+1)) in the second line primary scanning.

Likewise, the position (P3 (i, j)) which is the small area P3 on the inspected surface 220 in the first line primary scanning corresponds to the small area P2 (P2 (i, j+1)) in the second line primary scanning. The position (P2 (i, j)) which is the small area P2 on the inspected surface 220 in the first line primary scanning corresponds to the small area P1 (P1 (i, j+1)). While the small area P1 (P1 (i, j)) on the inspected surface 220 in the first line primary scanning has no corresponding small area in the second line primary scanning, as the scanning spot has gone beyond P0.

In this manner, the function of the second line primary scanning is an iteration of that of the first line primary scanning. For example, from the position at which the small area P4 has been disposed, the light intensity I4 of the fourth polarized light component M4 of the regularly reflected light L4 is detected in the first line primary scanning; while the position P4 (P4 (i, j)) acts as the small area P3 (i, j+1)) in the second line primary scanning and so the light intensity I3 of the third polarized light component M3 of the regularly reflected light L3 is detected.

Further, in a next secondary scanning the position acts as the small area P2 (P2 (i, j+2)) and thus the light intensity I2 of the second polarized light component M2 of the regularly reflected light L2 is detected. In a further next secondary scanning, the position acts as the small area P1 (P1 (i, j+3))

and thus the light intensity I1 of the second polarized light component M1 of the regularly reflected light L1 is detected.

In this way, with the scanning advanced, the light intensities of I1 to I4 of the respective 4 polarized light components M1 to M4 from all the respective small areas P1 to P4 on the inspected surface 220 which are within the scanning range of the laser beam L0' and with the edge parts excluded are detected and stored in the respective memory units 75a to 75d.

As the light intensity distribution throughout the scanning spot P0 is uniform, the projecting conditions of the laser beam L0' can be seemed as identical, thus the light intensities detected in the first line and that detected in the second line primary scanning or after are identical. For a same position (a small area) on the inspected surface 220, the 4 light intensities I1 to I4 obtained sequentially from each secondary scanning may also be deemed as what obtained simultaneously.

Therefore, for all the small areas within the scanning range excluding the edge parts on the inspected surface 220, the light intensities I1 to I4 are obtained according to each small area and stored in the respective memory units 75a to 75d. The arithmetic calculator 72 controlled by the controller 71 carries out the following calculations based on the light intensities I1 to I4 stored in the memory units 75a to 75d and calculates the respective Stock parameters S0 to S3, with corresponding to the respective positions on the inspected surface 220.

$$S0 = I1 + I2$$

$$S1 = I1 - I2$$

$$S2 = 2 \cdot I3 - (I1 + I2)$$

$$S3 = 2 \cdot I4 - (I1 + I2)$$

Thus, such obtained Stock parameters of each position can characterize the polarization properties of the corresponding position. Based on these, according to an ellipsometric method the calculator 72 calculates the film thickness and other physical property (the refraction index n and the absorption coefficient (the extinction coefficient) K, and so forth) of the film 210.

Moreover, when the data base 80 wherein a pre-stored data group containing physical property data and corresponding chemical names etc. is connected to the arithmetic processing device 70, the arithmetic processing device 70 can identify the chemical name etc. of the film 210 by comparing and referring the optical property data obtained by the arithmetic calculator 72 in the arithmetic processing device 70 to the data group in the data base 80.

As described above in detail, according to the surface inspection device 100 of the present embodiment it is capable to take not only the partial area but also the overall area of the inspected surface 220 as the inspecting object through the composite moving with the scanning stage 20. It is also possible to carry out an effective surface inspection by obtaining the light intensities for multiple polarized light components (with enough numbers of the polarized light components to identify the polarization property) of the regularly reflected lights from each of the small areas in the overall area of the inspected surface 220 in one-time scanning.

Moreover, the apertures 53a to 53d formed on the aperture stop 53 prevent the scattered lights, in other word the noise components, from the inspected surface 220 from reaching the light receiving units 41 to 44 except the regularly reflected lights L1 to L4, thus it is possible to improve the S/N of the detection value.

It means that it is possible for the surface inspection device 100 of the present embodiment to obtain the detection results with perfect accuracy not only when the inspected object 200 has the inspected surface 220 which is an evenly and smoothly made mirror surface but also when the inspected object 200 has the inspected surface 220 which is a coarse surface, thus it is possible to expand the types of the inspected objects.

Also, since the scanning spot P0 on the inspected surface 220 is divided into 4 small areas P1 to P4 and the film thickness and other physical properties of the film 210 are detected according to each of the small areas, it is possible for the surface inspection device 100 of the present embodiment to obtain the detection results with high spatial resolution.

Further more, according to the surface inspection device 100 of the present embodiment, as the polarization elements 60 are disposed to integrate with the aperture stop 53 in such a way as to occlude the respective apertures 53a to 53d, which are the optical paths of the respective regularly reflected lights L1 to L4 from the respective small areas P1 to P4, it is easy to manipulate these elements. It is possible to improve the spatial occupation efficiency, hence contributing to miniaturization of the surface inspection apparatus 100.

Moreover, according to the surface inspection device 100 of the present embodiment, since the 4 apertures 53a to 53d in the aperture stop 53 are aligned corresponding to the secondary scanning direction (y direction), it is possible to improve the spatial resolution accuracy of the small areas P1 to P4, i.e. the spatial differentiation accuracy of the regularly reflected lights L1 to L4, hence improving the detection accuracy of the surface inspection apparatus of the present embodiment.

In other words, when the inspected surface 220 is scanned through moving the scanning spot P0 by a combination of the primary and secondary scanning, it is common that moving direction (projecting direction) of the scanning spot P0 which scans the inspected surface 220 is configured to be approximately orthogonal to the primary scanning direction (x direction). And so is the surface inspection apparatus 100 of the present embodiment.

In such a case, the laser beam L0' whose cross section is a near circle forms an ellipse-shaped scanning spot P0 with a minor axis along the primary scanning direction (x direction) and a major axis along the secondary scanning direction (y direction) when it projects on the inspected surface 220.

Thus, in the case when such scanning spot P0 with a major axis along the secondary scanning direction is formed, when the scanning spot P0 (predetermined area) is spatially resolved into the 4 small areas P1 to P4 by the 4 apertures 53a to 53d in the aperture stop 53, a higher resolution accuracy can be obtained by resolving it along the major axis (y direction) than along the minor axis (x direction).

However, the surface inspection apparatus according to the present invention is not limited to the above aspect; it is also preferred that the alignment of the apertures 53a to 53d can be correspondingly arrayed not only along the secondary direction, but also along the primary direction, or along a direction at a tilted angle with respect to the primary and secondary directions.

Figure 7:
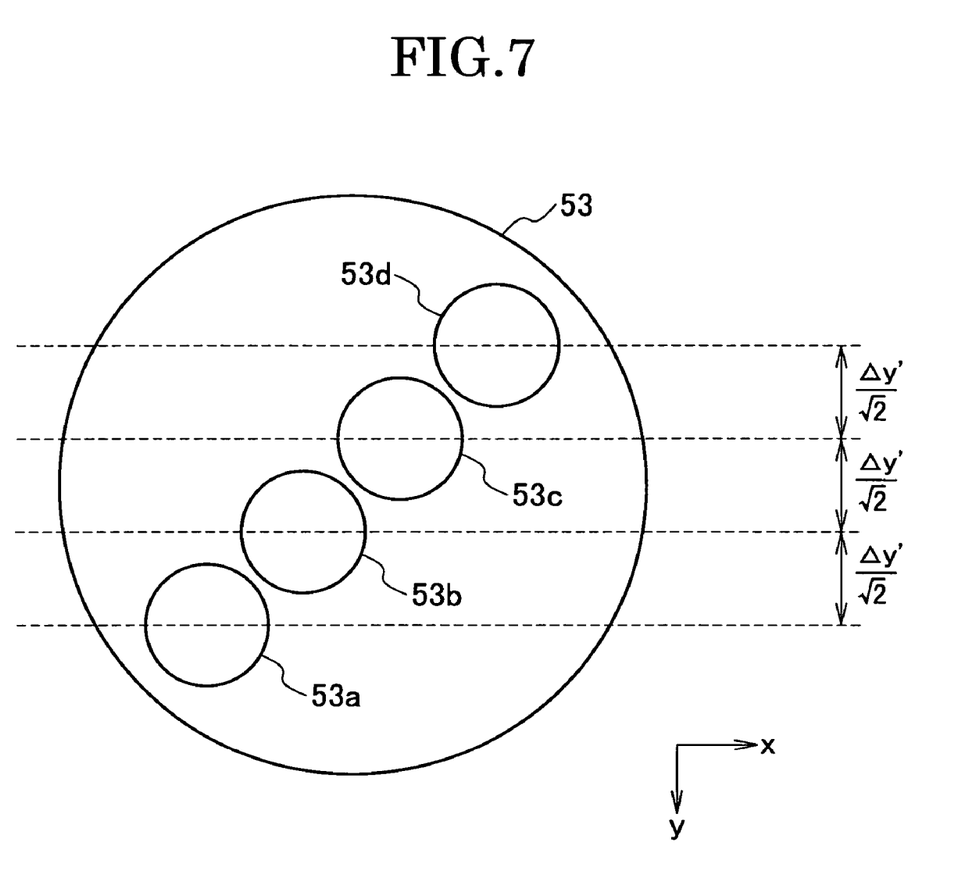
FIG. 7 is a view showing another example of an alignment of the apertures in the aperture stop.

Particularly as shown in FIG. 7, the 4 apertures 53a to 53d are aligned along a direction at a tilted angle of 45° with respect to the primary direction (x direction) and secondary direction (y direction). Along the primary scanning direction, a higher frequency wave is used for the sampling period of the A/D converters 73a to 73d, and along the secondary scanning direction, a pitch which is smaller (about $1/\sqrt{2}$) than $\Delta y$ can be obtained, thus it is possible to get a detection result with a higher resolution.

Figure 6:
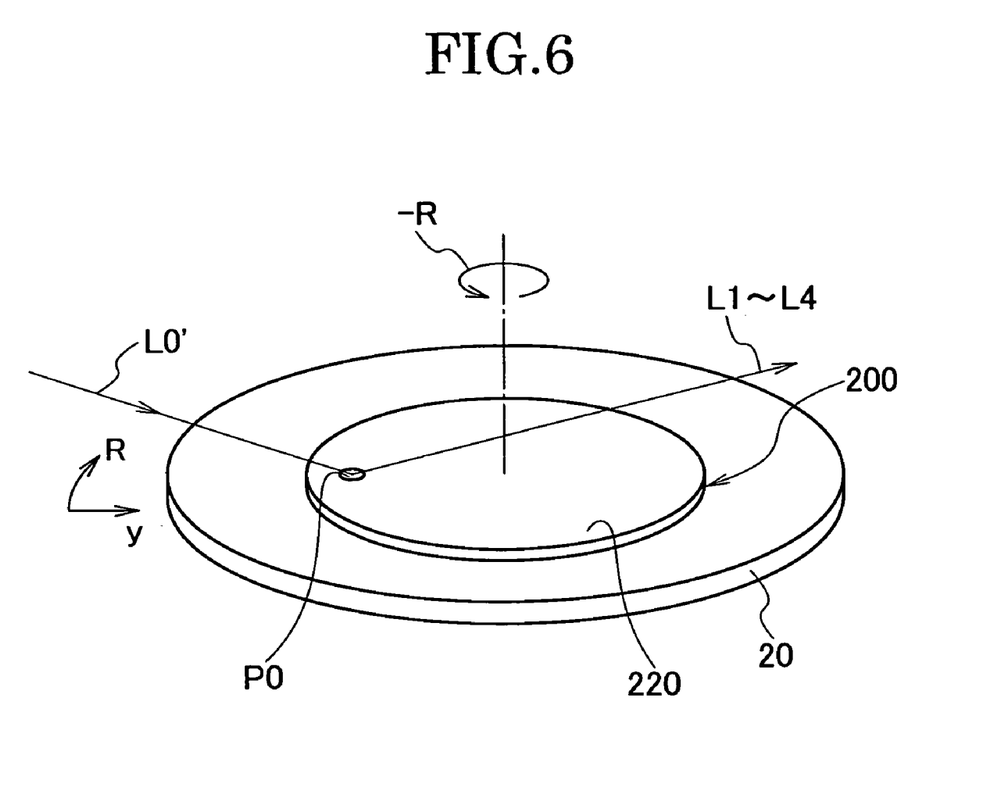
FIG. 6 is an example view showing a rotary scanning device.

According to the surface inspection apparatus 100 of the present embodiment, the xy 2 dimensional scanning stage 20 which carries out the translation scanning with parallel translations along minus (−) x and minus (−) y is provided as the scanning device. The surface inspection apparatus 100 according to the present invention is not limited to this aspect of scanning device. As shown in FIG. 6, a 2 dimensional rotary scanning stage 20 which carries out a combinational scanning of a rotary primary scanning along minus (−) R direction and a parallel secondary scanning minus (−) y direction which is roughly orthogonal to the primary scanning direction is also preferred.

Such a rotary scanning device, which is capable to perform a wide range scanning effectively, is especially useful in the case when the inspected surface 200 has a circular shape, such as a semiconductor wafer, etc.

For either of the scanning devices of the present embodiment shown in FIG. 1 and FIG. 6, it is the 2 dimensional scanning stage 20 who translates along both the primary and secondary scanning directions, while the laser beam L0' remains static; it is also possible to make the laser beam L0' carry out the scanning by applying known scanning optical systems such as a polygon mirror, or a fθ lens etc., in at least one of the primary scanning and secondary scanning directions.

It is favorable to obtain the parallel or rotary scanning position of the scanning spot on the inspected surface by the arithmetic processing device 70 based on the output from the scanning devices such as a linear sensor, or an encoder etc., it is also favorable to associate the result detected by the light intensity detecting device with the position of the scanning spot on the inspected surface.

According to the surface inspection apparatus 100 of the present embodiment, the light source 10 which emits multiple beams also functions as a light intensity distribution adjusting device so that the light intensity distribution of the laser beam L0', which is emitted from the light source 10 and projects on the predetermined area P0, over all the small areas P1 to P4 is uniform. It is also favorable that the light intensity distribution adjusting device is not used so that the light intensity distributions of the laser beam L0' which reaches the predetermined area P0, over all the small areas P1 to P4 is not uniform.

In such case, it is only necessary to provide a compensation device which compensates the obtained light intensities I1 to I4 of the respective polarized light components M1 to M4 of the respective regularly reflected lights L1 to L4 from the predetermined area P0 with a compensation value which could be obtained provided that the light intensity distribution throughout all the small areas P1 to P4 in P0 is uniform.

Figure 8:
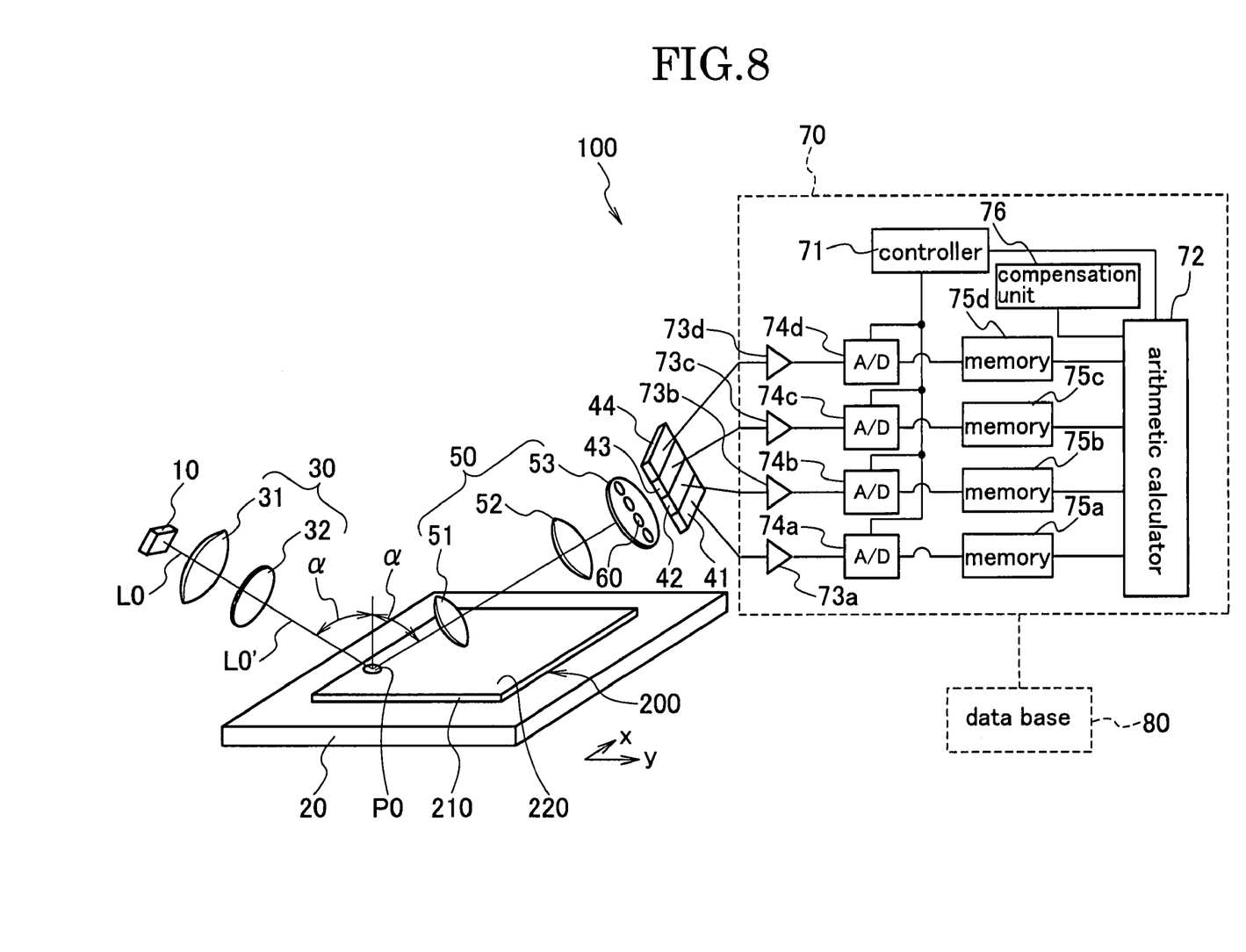
FIG. 8 is a block view showing the surface inspection apparatus having a compensation device to correct detected values based on a non-uniform light intensity distribution according to an embodiment of the present invention.

More specifically, the surface inspection apparatus 100 shown in FIG. 8 differs from the one shown in FIG. 1 on that the laser source 10 emits a single laser beam L0' and that the arithmetic processing device 70 includes a compensation unit 76 which functions as the compensation device described above.

Figure 9:
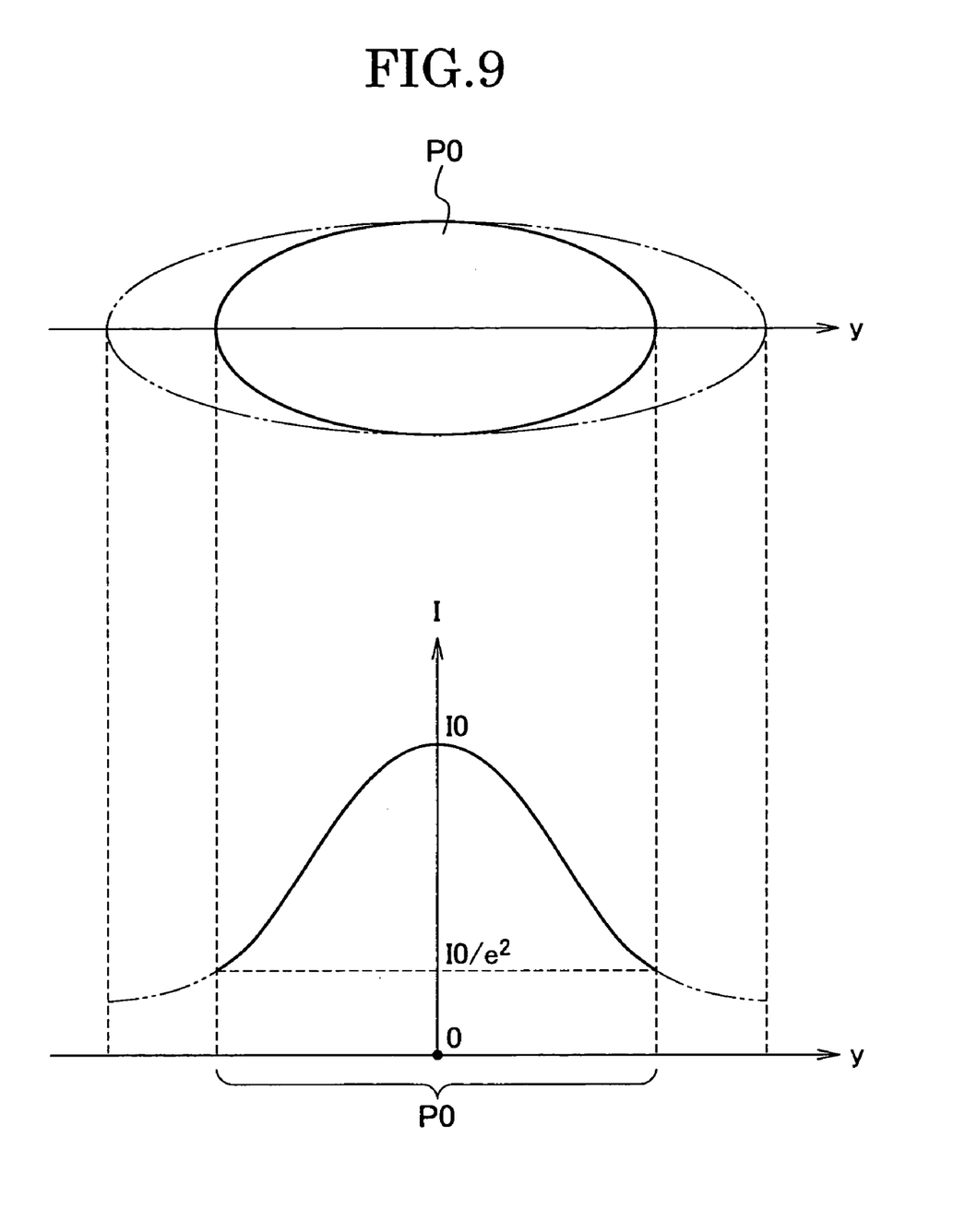
FIG. 9 is a view showing the non-uniform light intensity distribution throughout a predetermined area.

Herein, the single laser beam L0 emitted from the light source 10 passes through the condenser lens 31 and the polarization unit 32, reaches the inspected surface 220 as the laser beam L0', and projects on the predetermined area P0 of the inspected surface 220 as the scanning spot. The light intensity distribution throughout the scanning spot P0 is expressed as a Gaussian distribution as shown in FIG. 9, wherein the strongest light intensity I0 is present in the central part, while the weakest light intensity $I0/e^2$ is present in the surroundings.

As a result, it is obvious that the regularly reflected lights L1 and L4 from the respective small areas P1 and P4 positioned in the surroundings are weaker than the regular lights L2 and L3 from the respective small areas P2 and P3 positioned in the central part, and the light intensity I of the polarized light component M, that is, the final detection result, which depends on the light intensity distribution throughout the scanning spot P0, also becomes smaller.

To the detection values which are detected when the light intensity distribution throughout the small areas P1 to P4 is not uniform, the compensation device 76 will carry out a compensation processing with the compensation value which could be obtained provided that the light intensity distribution throughout all the small areas P1 to P4 in P0 is uniform, and thus it is possible to calculate the Stock parameters S0 to S3 with a perfect accuracy.

Figure 10:
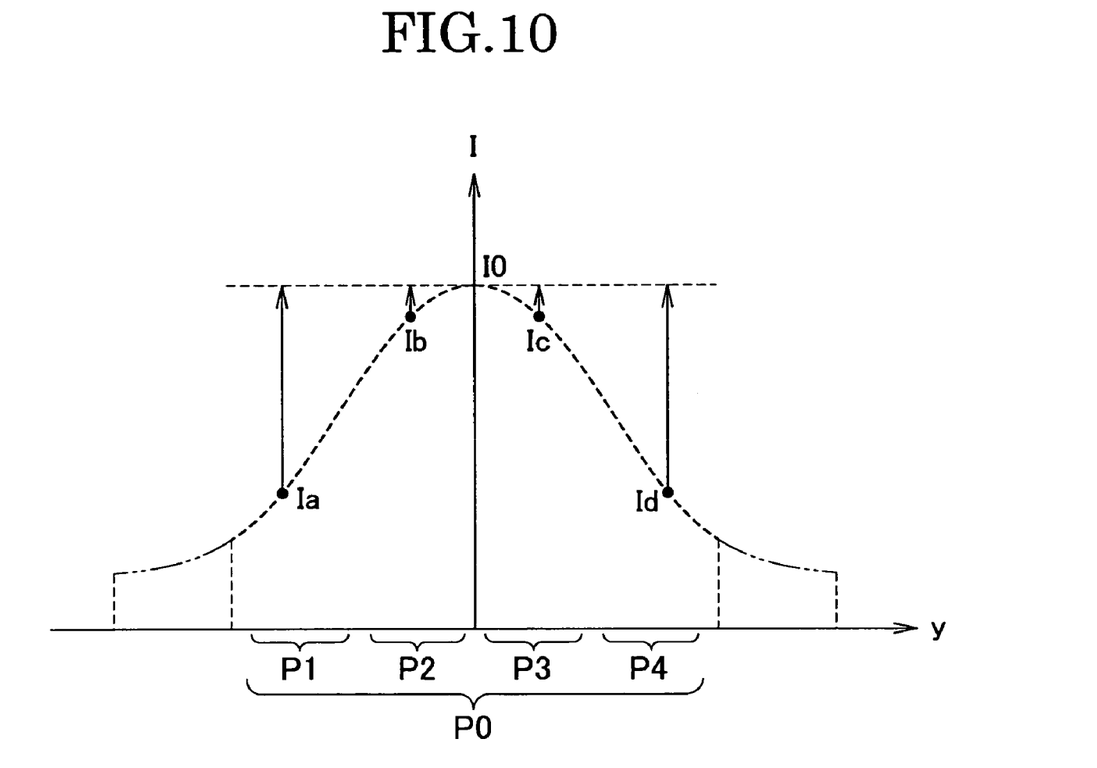
FIG. 10 is a view illustrating the concept of correcting a non-uniform light intensity distribution into a uniform one.

As shown in FIG. 10, such compensation process may be carried out as the following:

compensation parameters, etc., which are needed to compensate light intensities Ia, Ib, Ic and Id of the respective small areas P1 to P4 in the predetermined area P0 to the predetermined value I0 respectively, are preliminarily determined, and the determined compensation parameters are preliminarily stored in the compensation device 76, then the compensation device 76 carries out the arithmetic compensation processing to the light intensities I1 to I4 of the detected polarized light components M1 to M4 with these compensation parameters.

What is claimed is:

1. A surface inspection apparatus, comprising:
    a light source for emitting a light beam with known polarization conditions;
    an optical illumination system for projecting the light beam emitted from the light source on a predetermined area of an inspected surface formed by a predetermined film;
    an optical detection system having lenses and an aperture stop, wherein the lenses spatially split reflection lights from multiple mutually different small areas of the predetermined area and transilluminate the reflection lights, the aperture stop has the same number of apertures corresponding to that of the small areas;
    polarization elements which are disposed on light paths of the respective reflection lights passed through the respective apertures in the aperture stop and transilluminate mutually different polarized light components;
    a light intensity detection device for individually detecting the light intensities of the respective reflection lights passed through the respective polarization elements;
    a scanning device for making the light beam scan the inspected surface in a way to assure that the reflection lights from the respective small areas would pass all the respective apertures in the aperture stop sequentially; and
    an arithmetic processing device for detecting the polarization conditions of the respective reflection lights from the predetermined area based on the detection result of the light intensities of the multiple mutually different polarized light components of the respective reflection lights, and on the basis of the determined polarization conditions a film thickness of the film and at least one of the physical properties of the film can be obtained.

2. The surface inspection apparatus according to claim 1, wherein the scanning through the scanning device is a combination of a primary scanning depending on a parallel translation or rotary translation and a secondary scanning depending on a parallel translation with a direction roughly orthogonal to that of the primary scanning, the multiple apertures in the aperture stop are aligned along the corresponding direction to that of the secondary scanning.

3. The surface inspection apparatus according to claim 2, wherein the polarization elements are disposed in the way to occlude the respective apertures in the aperture stop with respect to the respective optical paths and integrated with the aperture stop.

4. The surface inspection apparatus according to claim 3 wherein a light intensity distribution adjusting device is provided to adjust light intensity distribution such that the light intensity distribution of the light beam emitted from the light source and projected on the predetermined area is uniform throughout all the small areas.

5. The surface inspection apparatus according to claim 3, wherein a compensation device is provided to compensate the determined value of the light intensity of the reflection light when the light intensity distribution of the light beam emitted from the light source and projected on the predetermined areas is not uniform throughout all the small areas with a compensation value which could be obtained provided that the light intensity distribution throughout all the small areas is uniform.

6. The surface inspection apparatus according to claim 2, wherein a light intensity distribution adjusting device is provided to adjust light intensity distribution such that the light intensity distribution of the light beam emitted from the light source and projected on the predetermined area is uniform throughout all the small areas.

7. The surface inspection apparatus according to claim 2, wherein a compensation device is provided to compensate the determined value of the light intensity of the reflection light when the light intensity distribution of the light beam emitted from the light source and projected on the predetermined areas is not uniform throughout all the small areas with a compensation value which could be obtained provided that the light intensity distribution throughout all the small areas is uniform.

8. The surface inspection apparatus according to claim 1, wherein the polarization elements are disposed in the way to occlude the respective apertures in the aperture stop with respect to the respective optical paths and integrated with the aperture stop.

9. The surface inspection apparatus according to claim 8, wherein a light intensity distribution adjusting device is provided to adjust light intensity distribution such that the light intensity distribution of the light beam emitted from the light source and projected on the predetermined area is uniform throughout all the small areas.

10. The surface inspection apparatus according to claim 8, wherein a compensation device is provided to compensate the determined value of the light intensity of the reflection light when the light intensity distribution of the light beam emitted from the light source and projected on the predetermined areas is not uniform throughout all the small areas with a compensation value which could be obtained provided that the light intensity distribution throughout all the small areas is uniform.

11. The surface inspection apparatus according to claim 1, wherein a light intensity distribution adjusting device is provided to adjust light intensity distribution such that the light intensity distribution of the light beam emitted from the light source and projected on the predetermined area is uniform throughout all the small areas.

12. The surface inspection apparatus according to claim 1, wherein a compensation device is provided to compensate the determined value of the light intensity of the reflection light when the light intensity distribution of the light beam emitted from the light source and projected on the predetermined areas is not uniform throughout all the small areas with a compensation value which could be obtained provided that the light intensity distribution throughout all the small areas is uniform.

* * * * *